(12) United States Patent
Walker

(10) Patent No.: US 9,032,701 B2
(45) Date of Patent: May 19, 2015

(54) GRASS COLLECTION SYSTEM WITH THROUGH-SHAFT PTO

(71) Applicant: Walker Manufacturing, Inc., Ft. Collins, CO (US)

(72) Inventor: Dean M. Walker, Ft. Collins, CO (US)

(73) Assignee: Walker Manufacturing, Ft. Collins, CO (US)

( * ) Notice: Subject to any disclaimer, the term of this patent is extended or adjusted under 35 U.S.C. 154(b) by 0 days.

(21) Appl. No.: 13/622,354

(22) Filed: Sep. 18, 2012

(65) Prior Publication Data

US 2014/0075904 A1  Mar. 20, 2014

(51) Int. Cl.
*A01D 43/00* (2006.01)
*A01D 43/06* (2006.01)
*A01D 43/077* (2006.01)

(52) U.S. Cl.
CPC .................................. *A01D 43/077* (2013.01)

(58) Field of Classification Search
CPC ... A01D 43/063; A01D 43/07; A01D 43/077; A01D 43/06; A01D 2101/00; A01G 3/002; A01G 3/00
USPC .................................. 56/202, 16.6, 13.3, 11.7
See application file for complete search history.

(56) References Cited

U.S. PATENT DOCUMENTS

| | | | | |
|---|---|---|---|---|
| 2,514,519 A | * | 7/1950 | Ryan | 56/13.2 |
| 2,720,070 A | * | 10/1955 | Arrington | 56/13.4 |
| 3,999,316 A | * | 12/1976 | Palmer | 37/242 |
| 4,033,518 A | * | 7/1977 | Fleming et al. | 241/47 |
| 4,047,368 A | * | 9/1977 | Peterson | 56/202 |
| 4,158,469 A | * | 6/1979 | Risser et al. | 406/71 |
| 4,345,416 A | * | 8/1982 | Cameron | 56/13.3 |
| 4,597,203 A | * | 7/1986 | Middleton | 37/241 |
| D285,690 S | * | 9/1986 | Hoepfner et al. | D15/17 |
| 4,614,080 A | * | 9/1986 | Hoepfner et al. | 56/16.6 |
| 4,693,063 A | * | 9/1987 | Hoepfner et al. | 56/16.6 |
| 5,685,134 A | * | 11/1997 | Thornburg | 56/12.9 |
| 5,707,017 A | * | 1/1998 | Paolucci et al. | 241/55 |
| 5,778,648 A | * | 7/1998 | Parkes et al. | 56/202 |
| 5,983,613 A | * | 11/1999 | Winter | 56/13.3 |
| 7,191,485 B1 | * | 3/2007 | Ramer | 15/34 |
| 7,837,751 B2 | * | 11/2010 | Dunning et al. | 55/385.1 |

FOREIGN PATENT DOCUMENTS

JP        10033038 A  *  2/1998  ............. A01D 34/64

* cited by examiner

*Primary Examiner* — Árpád Fábián-Kovács
(74) *Attorney, Agent, or Firm* — Russell S. Krajec; Krajec Patent Offices, LLC

(57) ABSTRACT

A grass collection system may have an impeller with a through-shaft that mechanically couples power take off (PTO) energy to the mower deck. The PTO shaft may pass through the impeller and blower housing to power the mower deck, resulting in a compact mechanism. The PTO shaft may pass through a grass tunnel that connects between the blower housing and the mower deck, then may be connected to the mower deck to power the mower blades. The grass collection system may be deployed on a front mounted deck tractor that has front wheel drive. The front wheels may each have a hydrostatic pump and gearbox, and the PTO shaft may pass between or under the front wheel drive systems in connecting to the mower deck.

15 Claims, 3 Drawing Sheets

GRASS COLLECTION SYSTEM WITH THROUGH-SHAFT PTO

BACKGROUND

Grass collection systems for lawn mowers fall into two categories: active and passive systems. Passive systems may rely on air currents generated by mowing blades to propel the cut grass into a bin, bag, or other catcher. Active systems may have an impeller or blower that propels the cut grass into a bin, bag, or other catcher.

Active grass collection systems are powered by the lawn mower and can create large amounts of vacuum force to collect the grass clippings as well as mechanical propulsion to speed the clippings to a collection bin. In many cases, active grass collection systems are effective even when the grass may be thick and wet. Active grass collection systems are often used on commercial mowers where large mowing decks may create large amounts of clippings.

SUMMARY

A grass collection system may have an impeller with a through-shaft that mechanically couples power take off (PTO) energy to the mower deck. The PTO shaft may pass through the impeller and blower housing to power the mower deck, resulting in a compact mechanism. The PTO shaft may pass through a grass tunnel that connects between the blower housing and the mower deck, then may be connected to the mower deck to power the mower blades. The grass collection system may be deployed on a front mounted deck tractor that has front wheel drive. The front wheels may each have a hydrostatic pump and gearbox, and the PTO shaft may pass between or under the front wheel drive systems in connecting to the mower deck.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A grass catching system for a lawn mower may have a power take off (PTO) shaft that goes through a blower assembly and protrudes through a grass catching tunnel. The PTO shaft may be a used to power a mowing deck.

The grass catching system may be implemented on a self-propelled mower tractor that has front wheel drive. The front wheel drive system may have separate hydrostatic or other power sources, plus gearboxes, transmissions, or other component. Such a front wheel drive system may allow independent control of the front wheels for causing the tractor to steer.

The grass catching system with a through-shaft PTO connection may be a design that may allow more compact front wheel drive tractors with front-mounted decks. The PTO shaft passing through the blower mechanism may be more compact than designs where the PTO power may pass beside the blower mechanism.

The blower mechanism may be constructed such that the impeller is rigidly attached to the PTO shaft. In such design, the impeller may turn any time the PTO shaft is engaged and may turn at the same speed.

In some embodiments, the impeller may rotate independently of the PTO shaft. In such embodiments, the impeller may be connected to the PTO shaft using a clutch mechanism, which may allow the impeller to be disengaged from the PTO shaft during operation.

In some embodiments, the impeller may be connected to the PTO shaft using gears or pulley mechanism to rotate at a different speed than the PTO shaft. The gears or pulley mechanism may cause the impeller to rotate faster or slower than the PTO shaft. In some such embodiments, the impeller may be able to be rotated at a variable speed with respect to the PTO shaft. Such embodiments may be useful when the PTO shaft speed may not be an optimal speed for the impeller and blower system to perform.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

Figure 1:
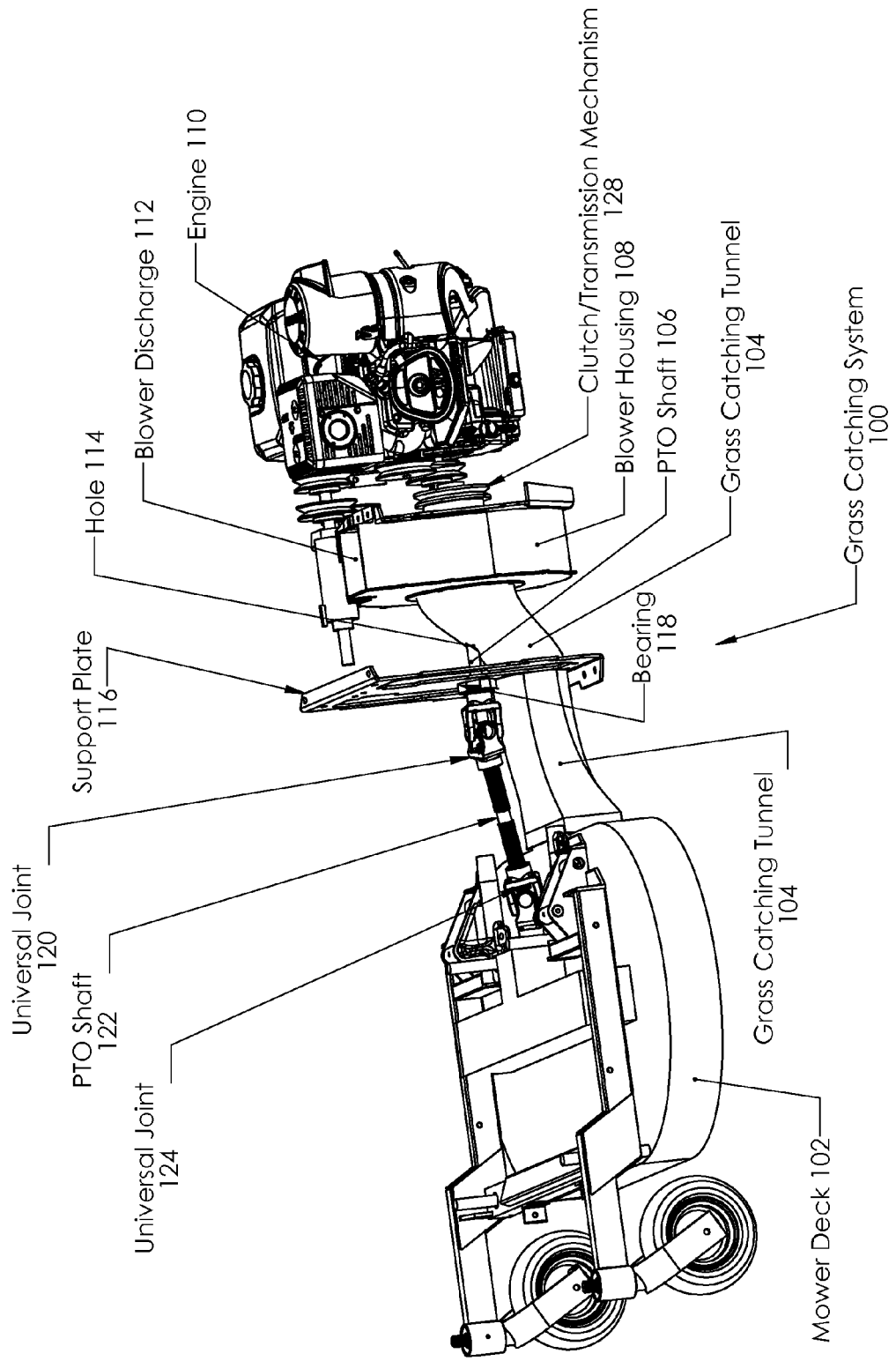
FIG. 1 is an isometric illustration of an embodiment showing a grass catching system.

FIG. 1 is a perspective view of an embodiment 100 showing a grass catching assembly. A mower deck 102 may exhaust into a grass catching tunnel 104 that connects to a blower housing 108. Embodiment 100 illustrates a typical configuration of a grass catching assembly that may be part of a self-propelled tractor. The other components that make up the self-propelled tractor have been removed for clarity. An example of entire tractor may be found later in this specification. FIG. 1 is not to scale.

The grass catching assembly is an active system that pulls grass clippings from the mower deck 102 and propels the clippings through the blower housing 108 and out through a blower discharge 112. The blower discharge 112 may dispense into a grass container that may hold clippings until emptied by a mower operator.

The blower housing 108 may contain an impeller which is hidden in the illustration. The impeller may be driven by the engine 110 and may rotate about the PTO shaft 106.

In some embodiments, the impeller may be rigidly attached to the PTO shaft 106 and may rotate whenever the PTO shaft rotates. In other embodiments, the impeller may be geared to the PTO shaft or otherwise connected such that the impeller may rotate faster or slower than the PTO shaft. In some embodiments, the impeller may be attached to the PTO shaft using a clutch mechanism that may engage or disengage the PTO shaft.

The engine 110 may drive both the impeller and the mower deck 102, as well as various other drive components. The engine 110 may be connected to a clutch and transmission mechanism 128 to power the various components. The clutch and transmission mechanism 128 may have a series of belts that may connect to the PTO shaft 106 on the engine side of the blower housing 108.

The PTO shaft 106 may protrude through the grass catching tunnel 104 through a hole 114, and then connect through a universal joint 120. The PTO shaft 106 may be supported by a bearing on the rear panel of the blower housing 108 and the bearing 118 mounted on the support plate 116.

A second PTO shaft 122, a second universal joint 124, to the mower deck 102.

Embodiment 100 illustrates an example of a mower deck 102 that may be powered using a directly connected rotating PTO shaft. In such embodiments, the mower deck may have blades that may be driven by gears. In other embodiments, the blades may be driven by a system of pulleys driven by one or more belt, where the belt may be driven from the PTO shaft.

Embodiment 100 is an example configuration of a grass catching system that may be deployed on many different types of tractors. In some cases, the tractors may have a mid-mounted mower deck, where the front wheels of the tractor are mounted in front of the mower deck. In other cases, the tractors may have a front-mounted mower deck, where the mower deck is mounted in front of the front wheels.

The PTO shaft 106 may protrude through grass catching tunnel 104, and may be coincident with the centerline of rotation for the impeller located inside the blower housing 108. Such a design may combine the PTO and blower assemblies such that the PTO energy may be transmitted to the mower deck 102 in a compact manner. Such a design may allow for a mower/tractor combination that is smaller and more compact than designs where the PTO shaft is not coincident with the grass blower mechanism. The design of embodiment 100 may also reduce the part count, making the overall tractor design less costly and may enhance reliability.

Figure 2:
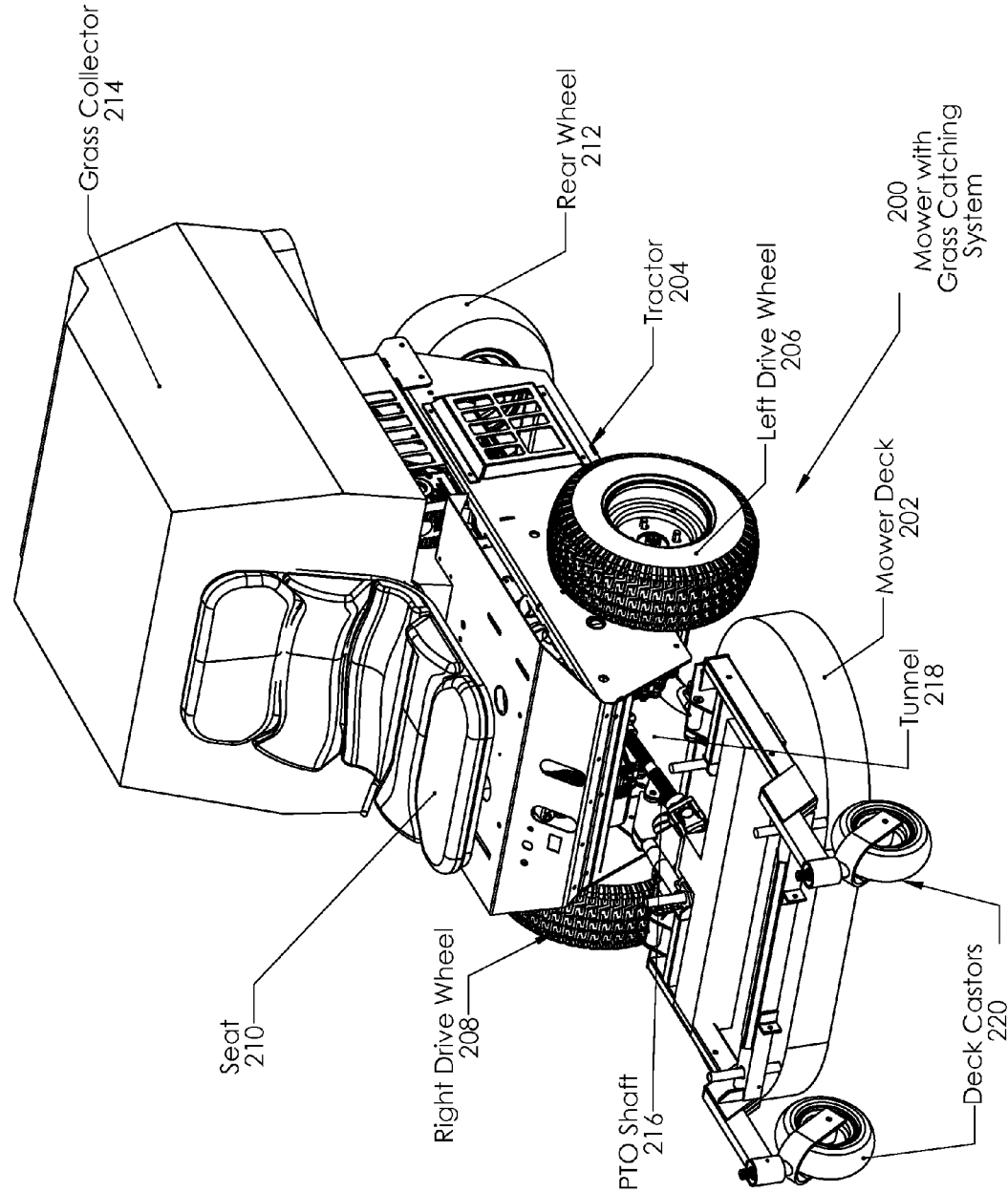
FIG. 2 is an isometric illustration of an embodiment showing a tractor with the grass catching system of FIG. 1.

FIG. 2 is a diagram illustration of an embodiment 200 showing a tractor 204 with a mower deck 202. The tractor 204 may be a front wheel drive tractor with a front mounted mower deck 202. The tractor 204 may be a three wheeled tractor, where the mower deck 202 may ride on a set of desk castors 220. The deck castors 220 may allow the mower deck 202 to follow the contour of a lawn independently of the tractor 204. The tractor 204 may be driven by an operator who may sit on the seat 210. The controls for operating the tractor 204 are not shown in the illustration. FIG. 2 is not to scale.

Embodiment 200 is merely one example of a tractor that may be used for mowing. Other tractor designs may include three or four wheeled designs where the mower deck may be mounted between the front and rear wheels. Such a design may be known as a mid-mounted deck design.

In many tractor designs, a mower deck may be mounted such that the mower deck articulates or moves with respect to the tractor. In such designs, the mower deck may have castors or other wheels that may allow the mower deck to follow the contour of the ground separately from the tractor. Such designs may reduce any uneven cutting on a lawn that may have severe contours. Such designs may also allow the mower deck to be removed from the tractor and still have the tractor operate independently. In still another tractor design, the tractor may be rigidly attached to a mower deck. Such designs may be compact and an operator may stand or sit on such designs.

Virtually any tractor design may use the grass collector system illustrated in embodiment 100, where PTO for a mower deck may be transmitted through an impeller and blower housing.

The tractor 204 may have a left drive when 206 and a right drive wheel 208. The two drive wheels may be independently controlled to drive and steer the tractor 204, and a rear wheel 212 may be a castor wheel. In another designs, a tractor may have a steering wheel or set of steering wheels that may steer the tractor, and one or more drive wheels that may cause the tractor to move. In still other designs, a tractor may have a single drive wheel that may be articulated to also steer the tractor.

The tractor 204 may have a grass collection system similar to that shown in embodiment 100. The mower deck 202 may have a center discharge that discharges grass clippings into a tunnel 218. The tunnel 218 may be connected to a blower housing that vacuums the clippings and propels the clippings into a grass collector 214. Other embodiments may have side discharge, where the grass collection tunnel may attach to the side of the mower deck.

The mower deck 202 may be powered by a PTO shaft 216. A PTO shaft may be routed through the blower housing and may be used to drive an impeller in the blower housing as well as driving the blades in the mower deck 202.

Figure 3:
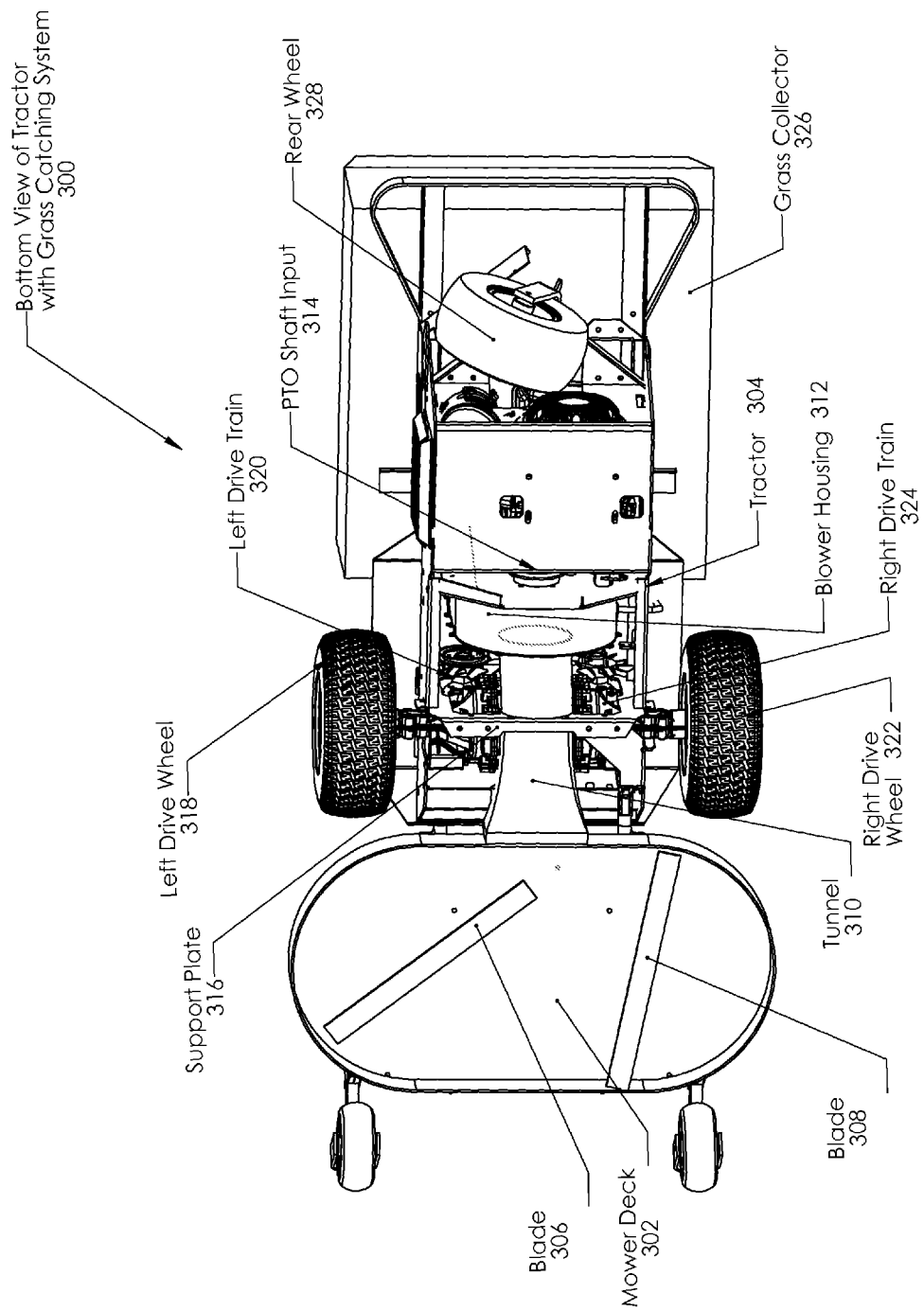
FIG. 3 is an isometric illustration of an embodiment showing an underside view of the tractor of FIG. 2.

FIG. 3 is a diagram illustration of an embodiment 300 showing the underside of a tractor with a grass catching system. A mower deck 302 with blades 306 and 308 may be attached to a tractor 304. FIG. 3 is not to scale.

The grass catching system may have a grass catching tunnel 310 that collects from the center discharge of the mower deck 302 and connects to the intake on the blower housing 312. The blower housing may have an impeller that creates a vacuum on the mower deck side of the housing to collect grass clippings, and may propel the grass clippings into a grass collector 326.

The blades 306 and 308 may be powered by a PTO shaft. The PTO shaft input 314 may be oriented to pass through the blower housing 312 and exit through a hole in the tunnel 310. The PTO shaft input 314 may contain a support bearing, and the support plate 316 may contain a second support bearing.

The tractor 304 may be driven by a left drive wheel 318 with a left drive train 320 and a right drive wheel 322 with a right drive train 324. The left drive train 320 and right drive train 324 may be independently controllable, so that the tractor 304 may be driven forward, in reverse, as well as turn either direction by controlling the drive wheels. The rear wheel 328 may be a castor wheel that follows the motion of the tractor 304.

The grass catching tunnel 310 and PTO shaft may pass between the left drive train 320 and the right drive train 324. The compact design of the PTO shaft passing through the blower housing 312 may allow a larger grass catching tunnel 310 in the same volume and a larger blower housing 312 than could be accommodated with a design where the PTO shaft did not pass through the center axis of the blower housing 312.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A grass catching system for a self-propelled tractor comprising:

a grass catching tunnel having an input end to receive grass clippings from a mowing deck, said grass catching tunnel further having an output end connected to a blower housing, said input end being a first hole in said grass catching tunnel, said output end being a second hole in said grass catching tunnel;

an impeller mounted in said blower housing, said impeller rotatable about an impeller axis; and a power take off shaft having a rotation axis coincident with said impeller axis, said power take off shaft protruding through a third hole in said grass catching tunnel;

said grass catching tunnel connecting to a center discharge mowing deck.

2. The grass catching system of claim 1, said blower housing comprising a rear bearing attached to said power take off shaft.

3. The grass catching system of claim 1, said impeller being directly attached to said power take off shaft.

4. The grass catching system of claim 1, said impeller being rotatable about said power take off shaft.

5. The grass catching system of claim 4 further comprising a clutch mechanism to disengage said impeller from said power take off shaft.

6. The grass catching system of claim 4 further comprising a power transmission mechanism to connect said power take off shaft to said impeller.

7. A self-propelled lawn mower comprising:
an engine having a power take off output;
a mower deck having a power take off input and a grass discharge chute;
a grass catching system comprising:
  a grass catching tunnel having an input end connected to said grass discharge chute and an exhaust end, said input end being a first opening in said grass catching tunnel, said exhaust end being a second opening in said grass catching tunnel;
  blower housing having an input connected to said exhaust end of said grass catching tunnel and a discharge end;
  an impeller mounted in said blower housing and having an impeller axis about which said impeller rotates; and
  a power take off shaft connected to said power take off output of said engine, said power take off shaft being coaxial with said impeller axis and protruding through a third opening in said grass catching tunnel, said power take off shaft being connected to said power take off input on said mower deck;
  said grass catching tunnel connecting to a center discharge mowing deck.

8. The self-propelled lawn mower of claim 7, said impeller being directly coupled to said power take off shaft.

9. The self-propelled lawn mower of claim 7, said grass catching system further comprising a clutch that disengages said impeller from said power take off shaft.

10. The self-propelled lawn mower of claim 7 further comprising:
a left drive wheel driven by a left drive train;
a right drive wheel driven by a right drive train;
said power take off shaft being located between said left drive train and said right drive train.

11. The self-propelled lawn mower of claim 10, said self-propelled lawn mower being front wheel drive.

12. The self-propelled lawn mower of claim 11, said mower deck being located in front of said left drive wheel and said right drive wheel.

13. The self-propelled lawn mower of claim 10, said self-propelled lawn mower being rear wheel drive.

14. The self-propelled lawn mower of claim 7, said power take off shaft being connected to said mower deck with a flexible coupler.

15. The self-propelled lawn mower of claim 7, said power take off shaft being connected to said mower deck with a belt.

* * * * *